United States Patent
Dixon et al.

(10) Patent No.: US 7,686,287 B2
(45) Date of Patent: Mar. 30, 2010

(54) METHOD AND DEVICE FOR POSITIONING A WORKPIECE

(75) Inventors: Robert Dixon, Everett, WA (US); Jon Buckmiller, Everett, WA (US); Richard Irvine, Everett, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 11/511,575

(22) Filed: Aug. 29, 2006

(65) Prior Publication Data

US 2008/0054541 A1 Mar. 6, 2008

(51) Int. Cl.
*B23Q 1/25* (2006.01)
*B25B 1/22* (2006.01)

(52) U.S. Cl. .............................. 269/75; 269/20; 269/21; 269/8

(58) Field of Classification Search .................. 269/20, 269/75, 8, 21; 335/295
See application file for complete search history.

(56) References Cited

U.S. PATENT DOCUMENTS

| | | | |
|---|---|---|---|
| 4,118,888 A | 10/1978 | Ogawa | |
| 4,435,905 A | 3/1984 | Bryan | |
| 4,461,463 A * | 7/1984 | Okubo | ........................ 269/60 |
| 4,492,036 A | 1/1985 | Beckwith | |
| 4,934,671 A * | 6/1990 | Laninga et al. | ................. 269/20 |
| 5,634,749 A | 6/1997 | Edis | |
| 6,575,443 B2 | 6/2003 | Kick | |
| 2005/0007225 A1 * | 1/2005 | Kruse et al. | ................. 335/205 |

* cited by examiner

*Primary Examiner*—Lee D Wilson
(74) *Attorney, Agent, or Firm*—Tung & Associates

(57) ABSTRACT

A device for positioning a workpiece includes a socket body rotatably held on a metallic ball by an array of permanent magnets arranged into a partial socket. An air delivery system controls a flow of air passing between the magnets and the ball to alter the friction between the socket body and the ball. A positive flow of air into the socket reduces the friction, allowing the workpiece to be more easily rotated during repositioning, whereas drawing air away from the socket produces a partial vacuum which increases the friction, causing the socket body to be locked in a single position on the ball.

20 Claims, 3 Drawing Sheets

METHOD AND DEVICE FOR POSITIONING A WORKPIECE

FIELD OF THE INVENTION

The present invention broadly relates to devices for holding and positioning parts and workpieces, and deals more particularly with a method and device for positioning a workpiece using an air assisted, magnetic ball and socket.

BACKGROUND OF THE INVENTION

Various devices have been used in the past to hold and position objects such as parts and workpieces. Positioning devices are particularly important in manufacturing environments where a workpiece being assembled must be repositioned as a worker performs assembly or other operations on the workpiece. One example of the need for robust workpiece positioners is found in the aircraft industry where many assemblies are manufactured on manual assembly lines where workers must orient and periodically reposition a workpiece to many different positions during assembly or other operations.

In the past, workpiece holders/positioners have been employed that are limited in their ability to reposition a workpiece in all possible positions that might be required by an operator. In those cases where a complete range of motion is provided for positioning a workpiece, relatively complex joints and linkages are necessary. Most workpiece positioners that are relatively simple in construction pivot only approximately 45 degrees about a central axis, while other, more complex positioners are relief milled so that they can rotate up to 90 degrees in one restricted plane. However, even these prior art positioners do not always allow a workpiece to be positioned so that it is ergonomic and readily accessible by mechanics or assembly operators. Additionally, those prior positioners that are simple in construction are sometimes limited in their ability to hold and position heavy loads.

Accordingly, there is a need for a workpiece positioner that is both simple in construction and allows a greater range of motion, up to 180 degrees, without restriction. The present invention is directed towards satisfying this need in the art.

SUMMARY OF THE INVENTION

In accordance with one aspect of the invention, a device is provided for positioning an object such as a part, comprising a body for mounting the object on the device; an array of magnets carried on the body and spatially arranged form at least a partial socket; a ball at least partially rotatable within the socket and formed of a material magnetically attracted to the magnets; and, a compressed air delivery system for delivering compressed air to the interface between the socket. The magnets are preferably permanent magnets spatially arranged in a spherical section, and wherein adjacent magnets have alternating north and south poles, respectively. The body may be integrally formed as by molding, with the magnets, or may be manufactured with a plurality of cavities in which the magnets are later installed. The compressed air delivery system may include one or more nozzles that introduce compressed air from a source to one or more channels formed in a surface of the body, contiguous to the socket. The introduction of compressed air into the socket reduces the force applied by the magnets to the ball, thus allowing the workpiece to be more easily repositioned.

In accordance with another aspect of the invention, a device is provided for positioning a workpiece, comprising a first portion including a spherical surface formed of a magnetically attractable material; a second portion on which the workpiece may be mounted; a plurality of permanent magnets carried on the second portion for magnetically attracting and holding the second portion on the first portion, the permanent magnets being arranged to form a socket for receiving the spherical surface of the first portion, and wherein the first and second portions are relatively rotatable to allow the workpiece to be moved any of a plurality of positions; and, an air supply line communicating with the socket for delivering a flow of pressurized air to the space between the magnets and the spherical surface. The device also comprises a support on which the ball is mounted, allowing the socket to be rotatable around essentially the entire outer surface of the ball, providing nearly 180 degrees of range of motion for workpiece positioning.

In accordance with another aspect of the invention, a device is provided for holding a part in any of multiple positions, comprising a support; a spherical ball formed of magnetically attractable metal and held on the support at a ball support area; a mount for mounting the part on the device; an array of permanent magnets carried on the mount and spatially arranged to form a partial socket around a section of the spherical ball, the socket being sized such that the socket may be moved around the entire spherical surface of the ball except for the ball support area. The device further includes a vacuum system including a vacuum line communicating with the partial socket for drawing air from the area between the magnets and the ball and urging the socket into tighter engagement with the ball, thereby locking the part in place.

In accordance with still another aspect of the invention, a method is provided for positioning a workpiece, comprising the steps of: mounting the workpiece on a body containing an array of magnets; arranging the magnets to form a socket on the body; mounting the socket on a metallic ball; holding the socket on the ball using the magnetic force of the magnets; changing the friction between the magnets and the ball using a flow of air; and, positioning the workpiece to a desired position.

Various additional objects, features and advantages of the present invention can be more fully appreciated with reference to the detailed description and accompanying drawings that follow.

DETAILED DESCRIPTION OF THE PREFERRED EMBODIMENTS

Figure 1:
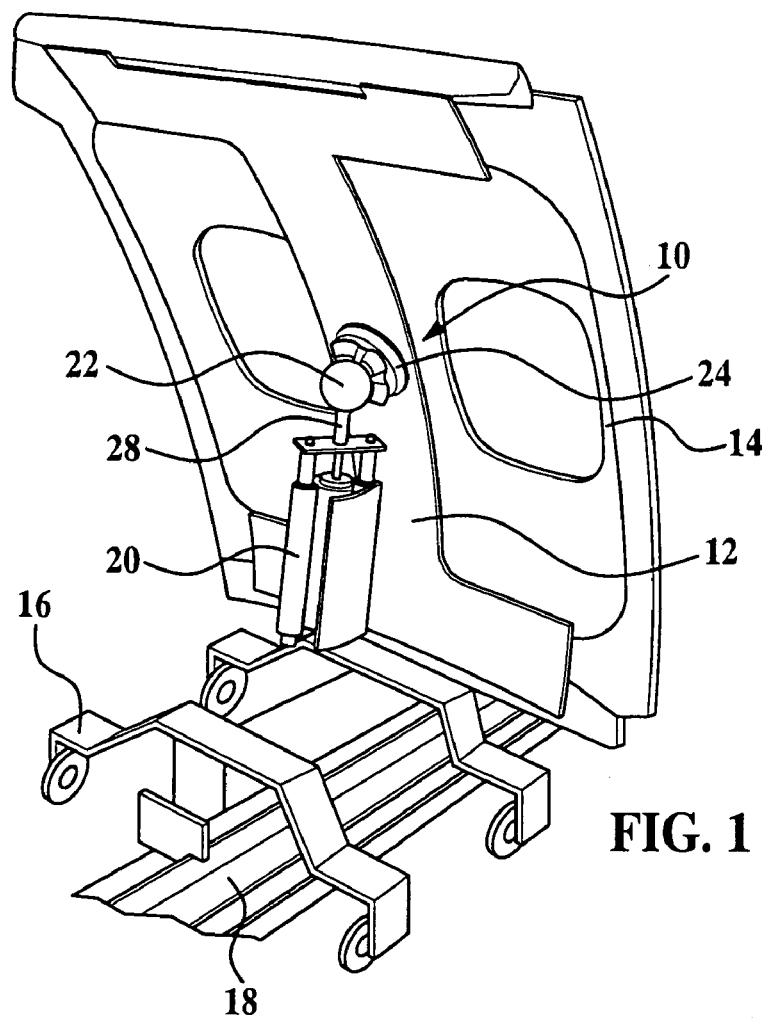
FIG. 1 is a perspective view of an air assisted device for positioning a workpiece, shown mounted on an assembly line trolley.
Figure 2:
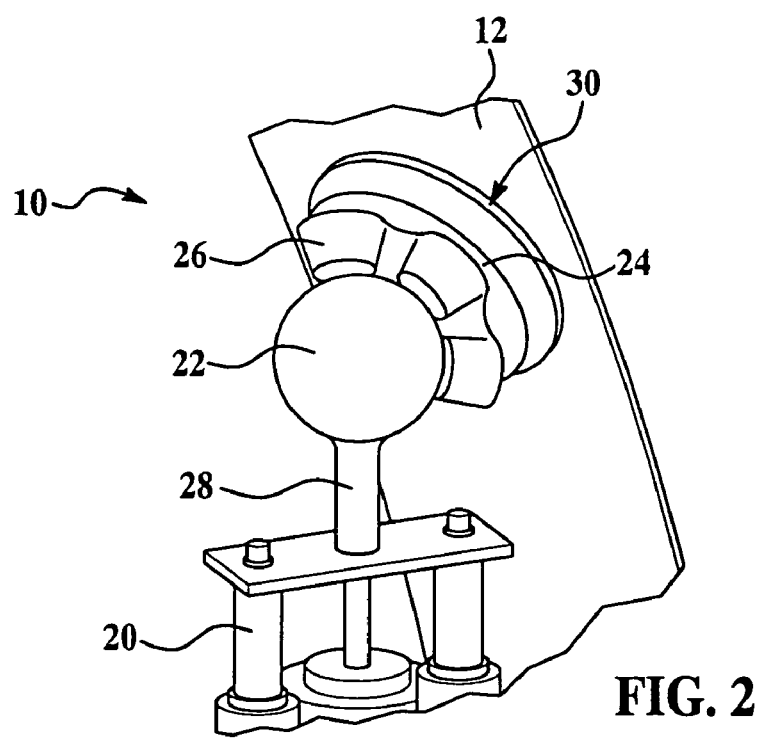
FIG. 2 is an enlarged, perspective view of the device shown in FIG. 1.
Figure 3:
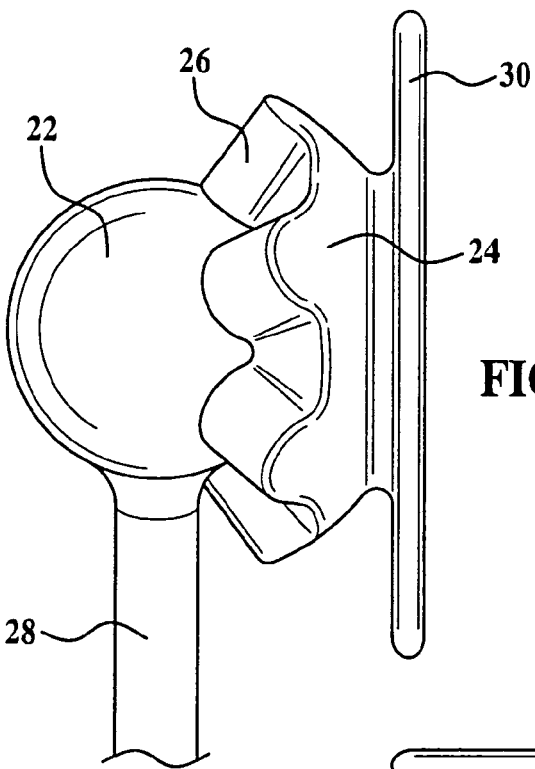
FIGS. 3 and 4 are perspective views of CAD representations of the device shown in FIG. 1.
Figure 4:
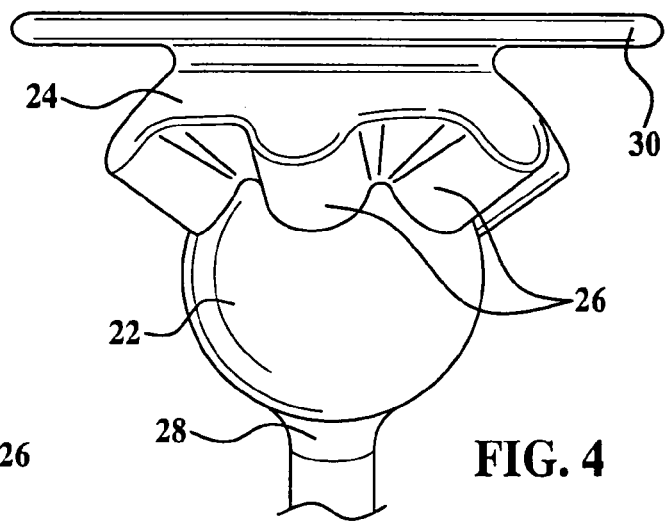

Referring first to FIG. 1, the present invention relates to an air assisted positioning device generally indicated by the numeral 10, for positioning or orienting a workpiece such as an aircraft fuselage panel 14, in any of a multiplicity of ergonomic positions to allow an assembly operator or mechanic to work on the panel 14. Broadly, the device 10 comprises a socket body 24 mounted on a ball 22 which is fixed to a support 28. In the illustrated example, the support 28 comprises the output shaft of a pneumatically operated cylinder and slide assembly 20 which controls the elevation of the panel 14. The slide assembly 20 is mounted on a wheeled trolley 16 guided along a track 18 which carries the panel 14 down an assembly line. The panel 14 is supported on a mounting fixture 12, which in turn is fixed to the socket body 24. The socket body 24, and thus the panel 14, is rotatable 180 degrees, or more around the entire surface of the ball 22, and is limited in rotational movement only by the support 28.

Referring now also to FIGS. 2-7, the ball 22 is spherical in shape and is formed of a metallic material having a large, positive magnetic susceptibility. Other suitable materials include, for example, iron, cobalt, nickel and alloys of these materials. These materials are sometimes referred to as being ferromagnetic.

Figure 8:
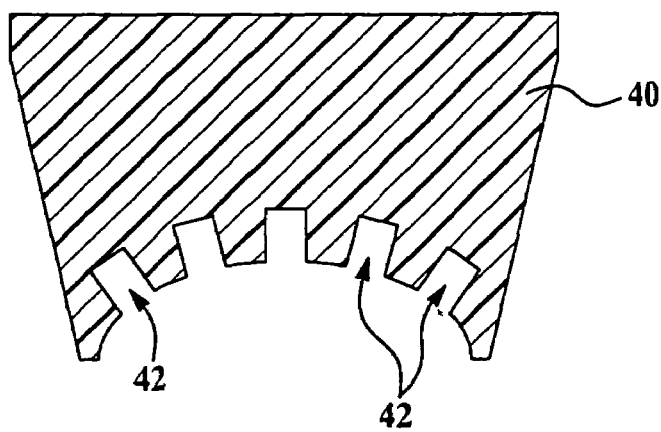
FIG. 8 is a cross sectional view of an alternate form of the socket body.

The socket body 24 includes a lower body portion containing an array of permanent magnets 26 arranged such that adjacent ones of the magnets 26 have alternating north and south poles. The socket body 24 includes an upper portion defining a mounting plate 30 on which a workpiece, or workpiece holding fixture can be mounted. The socket body 24 comprises non-ferromagnetic material such as ABS, carbon fiber, nylon or other synthetic material, formed by molding or machining. In the example shown in FIG. 6, the socket body 24 is integrally molded around the magnets 26, and the mounting plate 30 is formed as a separate part which is secured to the molded socket body 24. The outer ends of the socket body 24 surrounding the magnets 24 can be seen in FIG. 6 to engage or nearly engage the ball 22, so as to create an almost air-tight socket cavity. Alternatively, however, as shown in FIG. 8, the socket body 40 can be manufactured as a single part using rapid prototyping techniques such as SLS or FDM. The one-piece, socket body 40 shown in FIG. 8 has integrally formed cavities 42 into which the magnets 26 may be inserted and fixed in place.

The permanent magnets 26 are held by the socket body 24 in an spherical array forming a partial socket. One end of each of the magnets 26 contacts the spherical surface of ball 22. Although not shown in the drawings, the outer ends or faces of the magnets 26 that contact the ball 22 may be concave shaped so as to better conform to the spherical surface of the ball 22.

Figure 5:
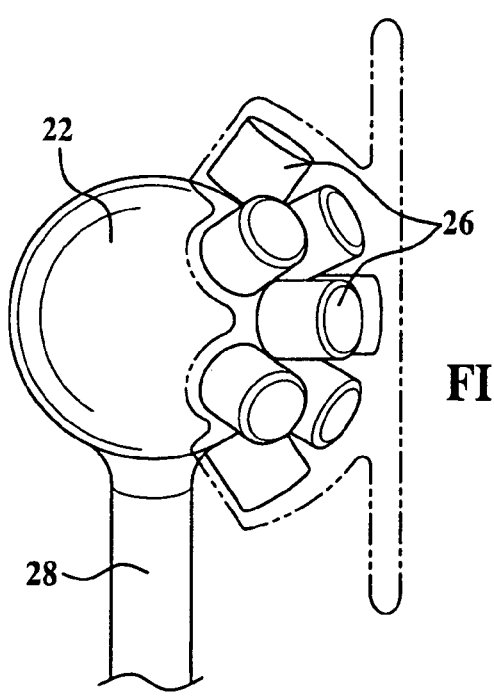
FIG. 5 is a perspective view of a CAD representation showing the arrangement of the magnet array relative to the surface of the ball.

As best seen in FIG. 5, the magnets 26 are arranged in an array such that their relative positions maximize the magnetic flux which attracts the ball 22. Although permanent magnets 26 are shown in the illustrated embodiment, it should be noted that electromagnets could alternately be used, although electromagnets would require wiring connections to a source of electrical power, in contrast to the simple construction provided by use of permanent magnets 26.

The semi-spherical, socket-like arrangement of the permanent magnets 26 produce a sufficient attractive force between the socket body 24 and the ball 22 to securely hold the panel 14 or other workpiece in the desired position. The socket body 24 may be rotated about the surface of the ball 22, limited only by contact with the support 28. Thus, depending upon the exact geometry and size of the socket body 24, the workpiece can be rotated 180 degrees or more.

Figure 6:
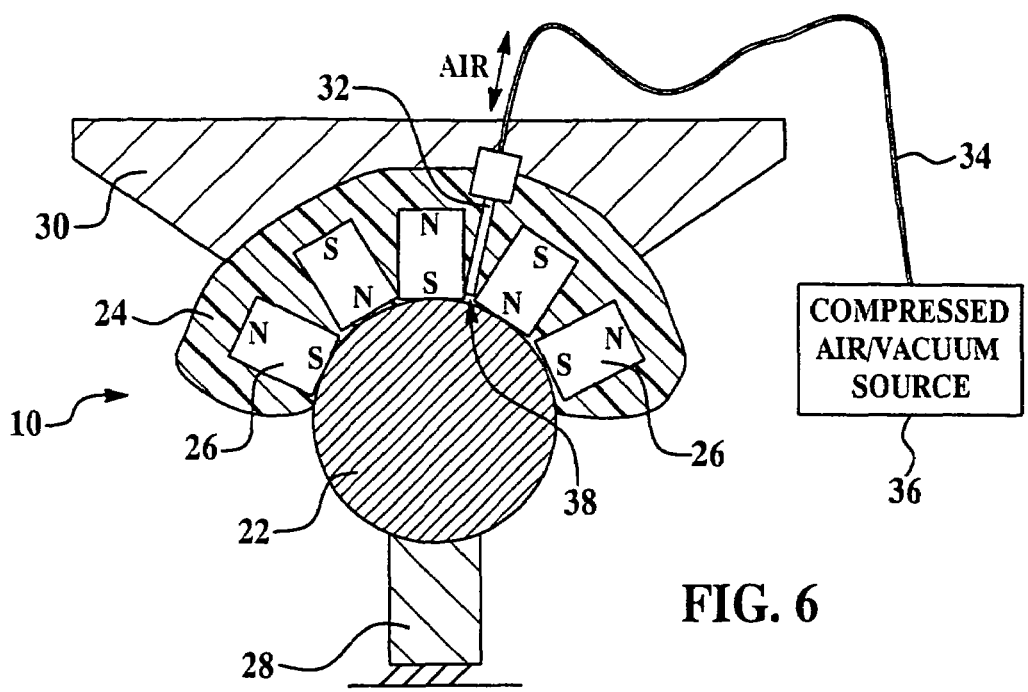
FIG. 6 is a cross sectional view of the device shown in FIG. 1, including an air flow control system for locking and releasing the positioning device.

In accordance with the present invention, the magnetic ball and socket positioner described above is assisted by the selective introduction of a flow of air between the interface of the ball 22 and the ends of the magnets 26 which contact the ball 22. As best seen in FIG. 6, an air nozzle 32 in the socket body 24 is connected with a pneumatic line 34 to a source of compressed air 36, or alternatively a vacuum. Compressed air supplied from the source 36 through the nozzle 32 is introduced at one or more openings 38 in the interior, concave shaped surface of the socket body 24, facing the ball 22. The introduction of this flow of compressed air moves the magnets 26 slightly away from the ball 22, thereby reducing the contact friction in an amount that allows the socket body 24, and thus the workpiece, to be more easily rotated to a desired position of orientation. When the workpiece has been so rotated, the compressed air supply is turned off, thus restoring the full level of friction generated by the magnets 26, locking the workpiece in place.

Figure 7:
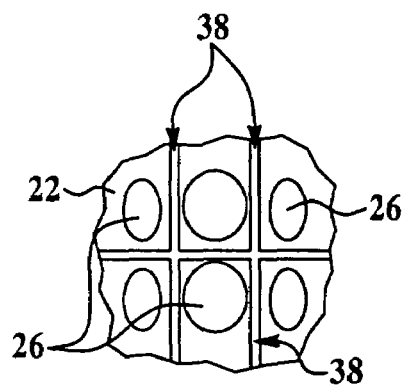
FIG. 7 is a fragmentary, bottom view of the socket body, showing air channels for controlling air flow.

In those applications where the workpiece may be particularly heavy, the vacuum source 36 may be used to withdraw air from the interface between the ball 22 and magnets 26, creating a partial vacuum within the concave socket body cavity which draws the magnets 26 more tightly into engagement with the ball 22. The resulting, increased friction causes the ball and socket to resist rotation more strongly. As shown in FIG. 7, the concave inner surface of the socket body 24 surrounding the ends of the magnets 26 may be provided with grooves or channels 38 which aid in the distribution of air flow so that the compressed air (or vacuum) is applied more evenly over the entire socket area.

Although this invention has been described with respect to certain exemplary embodiments, it is to be understood that the specific embodiments are for purposes of illustration and not limitation, as other variations will occur to those of ordinary skill in the art.

What is claimed is:

1. A device for positioning an object such as a part, comprising:

a body adapted to mount the object thereon;

an array of magnets carried on the body and spatially arranged to comprise at least a partial socket;

a ball at least partially rotatable within the socket, said ball formed of material magnetically attracted to the magnets, said socket defined by a concave surface adjacent an outer spherical surface of said ball, said socket moveable around an outer spherical surface of said ball; and, an air delivery system adapted to create a flow of pressurized air to a space at an interface between the socket and the ball in order to selectively change friction between the magnets and the ball during rotation.

2. The device of claim 1, wherein the magnets are permanent magnets.

3. The device of claim 1, wherein the body includes an exterior surface configured to have the object mounted thereon.

4. The device of claim 1, wherein the air delivery system comprises:

a source of compressed air comprising said pressurized air; and, a pneumatic delivery system adapted to deliver said pressurized air from the source to said space, said pressurized air reducing the friction between the magnets and the ball.

5. The device of claim 1, wherein one end of each of said magnets is adjacent to the outer spherical surface of said ball.

6. The device of claim 5, wherein said one end of each of said magnets conforms to the spherical outer surface of said ball.

7. The device of claim 1, further comprising a support fixed to said ball.

8. The device of claim 7, wherein said ball is fully spherical except for said support.

9. The device of claim 8, wherein said socket is moveable around said outer spherical surface of said ball limited only by said support.

10. The device of claim 1, wherein said space comprises at least one channel in said concave surface for distributing the flow of air across the socket.

11. A device for positioning an object such as a part, comprising:
    a body having a first side adapted to mount the object thereon;
    an array of magnets carried on a second side of the body and spatially arranged to comprise at least a partial socket;
    a ball at least partially rotatable within the socket, said ball formed of material magnetically attracted to the magnets, said socket defined by a concave surface adjacent an outer spherical surface of said ball;
    a support fixed to said ball;
    wherein said socket is moveable around said outer spherical surface of said ball limited only by said support; and,
    an air delivery system adapted to create a flow of pressurized air to a space at an interface between the socket and the ball in order to selectively change friction between the magnets and the ball during rotation.

12. The device of claim 11, wherein the magnets are permanent magnets.

13. The device of claim 11, wherein the air delivery system comprises:
    a source of compressed air comprising said pressurized air; and,
    a pneumatic delivery system adapted to deliver said pressurized air from the source to said space, said pressurized air reducing the friction between the magnets and the ball.

14. The device of claim 11, wherein said space comprises at least one channel in said concave surface for distributing the flow of air across the socket.

15. The device of claim 11, wherein one end of each of said magnets is adjacent to the outer spherical surface of said ball.

16. The device of claim 15, wherein said one end of each of said magnets conforms to the spherical outer surface of said ball.

17. A device for positioning an object such as a part, comprising:
    a body having a first side adapted to mount the object thereon;
    an array of magnets carried on a second side of the body and spatially arranged to comprise at least a partial socket;
    a ball at least partially rotatable within the socket, said ball formed of material magnetically attracted to the magnets, said socket defined by a concave surface adjacent to an outer spherical surface of said ball, wherein one end of each of said magnets is adjacent to and conforms to said outer spherical surface of said ball;
    a support fixed to said ball;
    wherein said socket is moveable around said outer spherical surface of said ball limited only by said support; and,
    an air delivery system adapted to create a flow of pressurized air to a space at an interface between the socket and the ball in order to selectively change friction between the magnets and the ball during rotation.

18. The device of claim 17, wherein the magnets are permanent magnets.

19. The device of claim 17, wherein the air delivery system comprises:
    a source of compressed air comprising said pressurized air; and,
    a pneumatic delivery system adapted to deliver said pressurized air from the source to said space, said pressurized air reducing the friction between the magnets and the ball.

20. The device of claim 17, wherein said space includes at least one channel in the concave surface for distributing the flow of air across the socket.

* * * * *